United States Patent [19]

Kawauchi

[11] 4,138,724
[45] Feb. 6, 1979

[54] CONTROL SYSTEMS OF OZONIZER SYSTEMS

[75] Inventor: Yasunobu Kawauchi, Fussa, Japan

[73] Assignee: Tokyo Shibaura Denki Kabushiki Kaisha, Kawasaki, Japan

[21] Appl. No.: 773,217

[22] Filed: Mar. 1, 1977

[30] Foreign Application Priority Data

Mar. 5, 1976 [JP] Japan .................................. 51/23794

[51] Int. Cl.² ........................ G06F 15/46; C01B 13/10
[52] U.S. Cl. .................................... 364/500; 204/176; 210/63 Z; 250/532
[58] Field of Search ......................... 204/176; 210/632; 21/74 A; 235/151.1, 151, 151.12; 250/532-541; 364/500, 496

[56] References Cited

U.S. PATENT DOCUMENTS

| 3,730,881 | 5/1973 | Armstrong ......................... 210/63 Z |
| 3,948,774 | 4/1976 | Lindman ........................... 250/532 X |
| 3,998,714 | 12/1976 | Armstrong ......................... 210/63 Z |
| 4,003,832 | 1/1977 | Henderson ........................ 204/176 X |
| 4,008,142 | 2/1977 | Doring et al. ................. 235/151.1 X |

*Primary Examiner*—Joseph F. Ruggiero
*Attorney, Agent, or Firm*—Stevens, Davis, Miller & Mosher

[57] ABSTRACT

In a control system of an ozonizer system wherein the ozonizer system comprises a plurality of ozonizer modules each consituted by one or more unit ozone generators, and the ozone generated by the ozonizer modules is supplied to one or more ozone utilization devices there are provided computer means responsive to the ozone demand of the ozone utilization devices for determining the quantity of ozone to be generated by the ozonizer modules, and a control device for controlling the operation of the ozonizer modules, especially the power applied thereto in response to the ozone quantity determined by the computer means.

6 Claims, 11 Drawing Figures

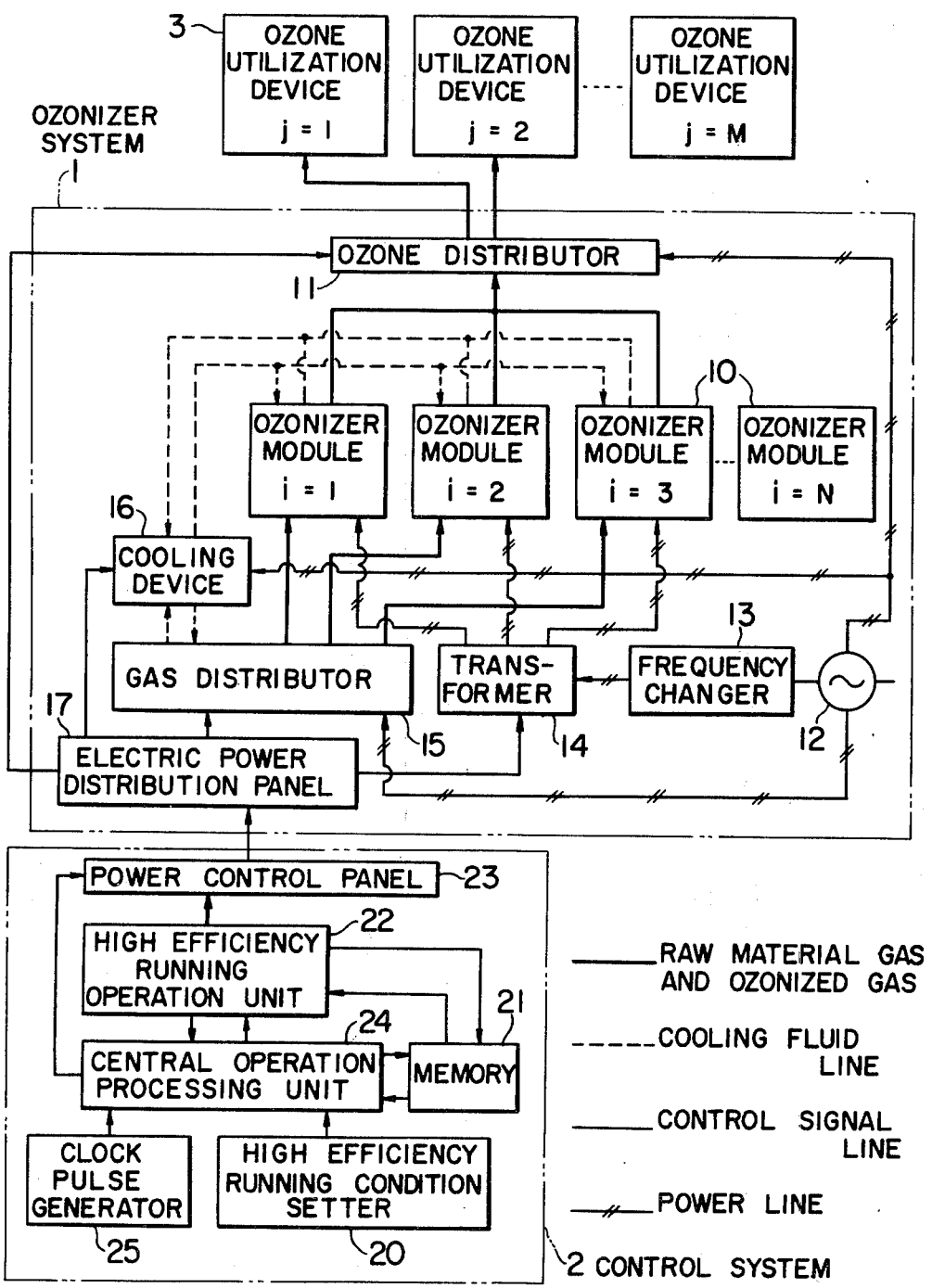

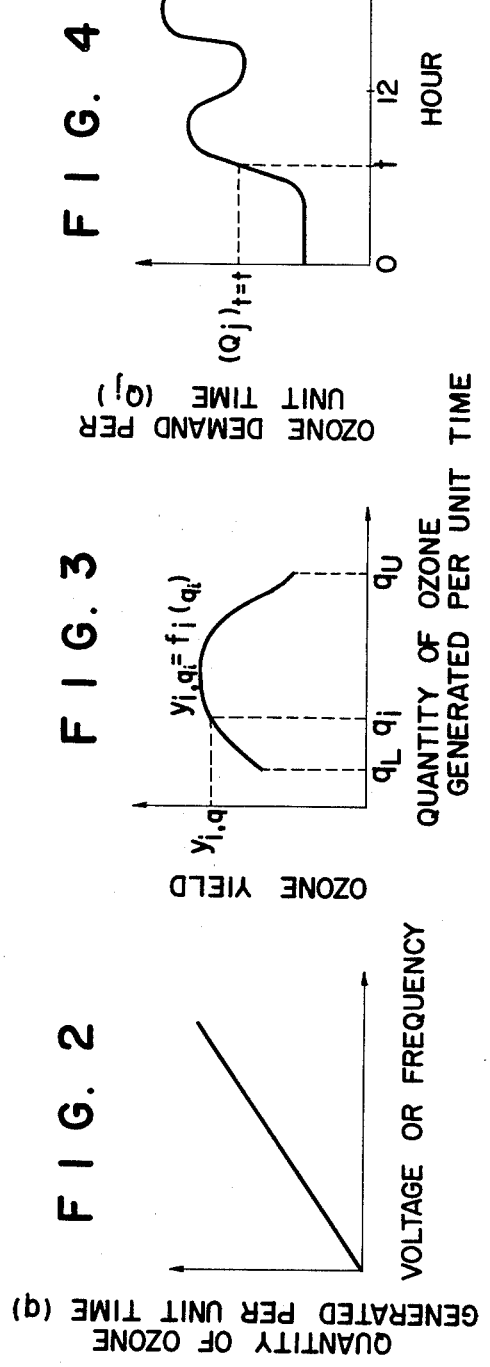

FIG. 6B

CONVERT $(q_i)_{t=t}$ INTO CONTROL SIGNAL OF QUANTITY OF OZONE GENERATED AND SUPPLY IT TO ELECTRIC POWER DISTRIBUTION PANEL 17

CONVERT $(Q_o)_{t=t}$ INTO CONTROL SIGNAL OF SUPPLY, COOLING AND DRYING OF RAW MATERIAL GAS AND SUPPY IT TO ELECTRIC POWER DISTRIBUTION PANEL 17

CONVERT $(q_i)_{t=t}$ INTO CONTROL SIGNAL FOR DISTRIBUTING RAW MATERIAL GAS AND SUPPLY IT TO ELECTRIC POWER DISTRIBUTION PANEL 17

CONVERT $(Q_j)_{t=t}$ INTO CONTROL SIGNAL FOR OZONE DISTRIBUTION VALVES V9, V10, V11 AND SUPPLY IT TO ELECTRIC POWER DISTRIBUTION PANEL 17

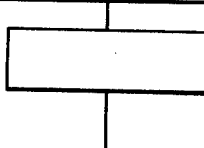

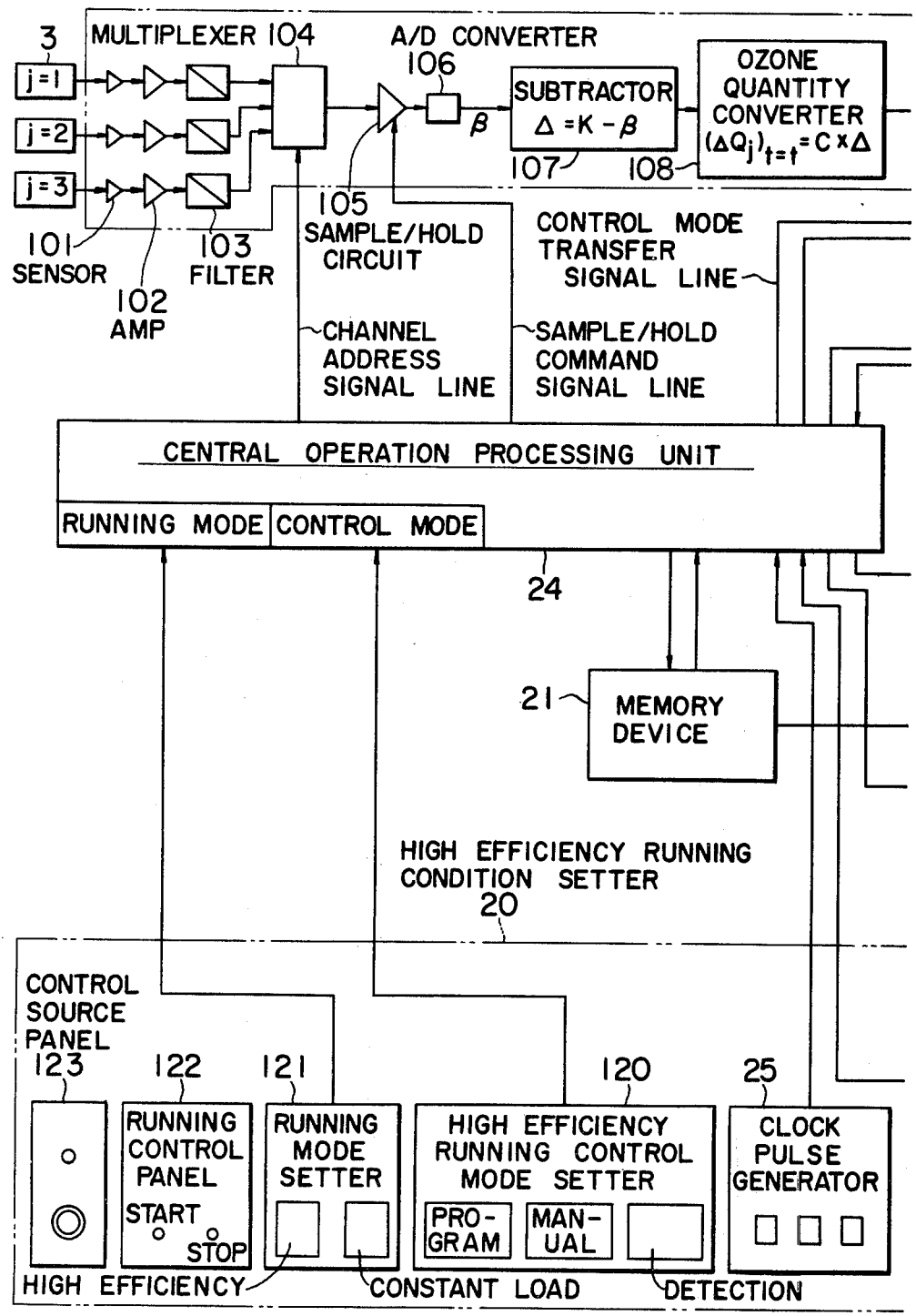

CONTROL SYSTEMS OF OZONIZER SYSTEMS

BACKGROUND OF THE INVENTION

This invention relates to a control system of an ozonizer system capable of operating the ozonizer system at high efficiencies.

Since ozone has a strong oxidizing power it has been used in many applications such as treatment of waste water containing organic matters, decoloring of colored waste water, sterilization and deodorization of aqueduct water and denitrification of engine exhaust gas or flue gas containing nitrogen oxides NOx. As a consequence, various types of industrial ozonizers have been developed in recent years wherein air or oxygen is used as the raw material gas for producing ozone.

Generally, an ozonizer comprises a plurality of unit ozone generators each including an inner glass pipe and an outer metal pipe and the quantity of the ozone generated is determined by the number of the unit ozone generators. From the standpoint of handling and machining, the maximum dimensions of a practical unit ozone generator are: a diameter of about 80 mm and a length of about 2000 mm. These data determine the area of electric discharge and hence the maximum value of the amount of ozone generated. Accordingly, the capacity of an ozonizer system can be increased either by increasing the number of the unit ozone generators or by grouping into a module a relatively small number of unit ozone generators and by parallelly operating a plurality of such modules.

Generally, the module type ozonizer system is more advantageous than single ozonizer having the same capacity from the standpoint of utilization factor. Denoting the utilization factor by A, and the percentages of fault and repair of the module by $\lambda$ and $\mu$ and asscerning that $\lambda$ and $\mu$ are equal for each module, then a relation $A = \mu/(\lambda + \mu)$ holds for each module. If P modules among a total of N modules are in an operable condition under a partial load condition under which it is possible to produce a quantity of ozone consistent with the demand the utilization factor can be expressed by the following equation $$A_{P/N} = \sum_{i=p}^{N} \binom{N}{i} A^i (1-A)^{N-i} \quad (1)$$

where i represents an integer smaller than or equal to N. To simplify the description, suppose now that N=3 and P=2, then $$A_{2/3} = \frac{\mu^2(3\lambda + \mu)}{(\lambda + \mu)^2} \quad (2)$$

Where the mean time between failures (MTBF) is equal to 1,000 hours and the mean time to repairs (MTTR) is equal to 10 hours, the utilization factor is calculated as $A_{2/3} = 0.9997$ since $\lambda = 0.0011$/hour and $\mu = 0.11$/hour. In the case of a single ozone generator having the same capacity as a group of modules since $A_{1/1} = \mu/\lambda + \mu$, the utilization factor is equal to $A_{1/1} = 0.9901$, showing that the utilization factor of the module type ozonizer system is higher than that of a single ozone generator.

The efficiency of ozone generation of an ozonizer utilizing air as the raw material is about 5% of the electric power supplied to the ozone generator and remaining 95% is converted into heat. An increase in the temperature of the ozone generator and of the raw material air decreases the efficiency of ozone generation and the insulating strength of the dielectrics utilized in the ozone generator. For this reason, it is necessary to cool and dry the raw material air and to cool the ozone generator. In some cases, the power required for such cooling amounts to about ⅓ of the total power of the ozonizer system.

While the quantity of the ozone generated increases in proportion to the applied voltage or frequency since these electric quantities are proportional to the electric power, the quantity of heat generated increases with these electric quantities. Especially, in the case of a high frequency discharge, although the quantity of the ozone generated increases, the temperature increases greatly due to the increase in the dielectric loss so that if cooling is not sufficient, insulation breakdown occurs. As the temperature increases, decomposition of the ozone generated becomes remarkable, thereby decreasing the yield of ozone. Where the ozone demand varies with time due to the variation of the load of the treating apparatus utilizing ozone, unless the electric power supplied to ozone generators constituting an ozonizer system and to such peripheral apparatus as the apparatus for feeding, cooling, drying and distributing the raw material air, and a device for cooling the cooling water of such apparatus is controlled precisely, the quantity of the ozone generated per unit power that is the yield of the ozone decreases, thus increasing the operating cost of the ozonizer system. In the prior art ozonizer system control was made without considering these problems so that energy loss is large and the operation cost is high.

SUMMARY OF THE INVENTION

Accordingly, it is an object of this invention to provide an improved control system of an ozonizer system which controls the electric power for operating the ozonizer in accordance with the ozone demand, thereby improving the operating efficiency of the system.

Another object of this invention is to provide a novel control system of an ozonizer system in which the quantity of ozone to be generated by each ozonizer module is determined by the quantity of ozone demanded by one or more ozone utilization devices thereby saving the power required to operate the ozonizer system.

A further object of this invention is to provide a novel control system of an ozonizer system capable of reducing the capacity of the apparatus for treating unreacted ozone exhausted from the ozone utilization device.

A still further object of this invention is to provide a program control system of an ozonizer system capable of controlling the quantity of ozone to be generated by respective ozonizer modules in accordance with the load of a plurality of ozonizer modules thereby improving the utilization factor and the operating efficiency of the ozonizer system.

According to this invention there is provided a control system of an ozonizer system including a plurality of ozonizer modules each having at least one unit ozone generator for supplying generated ozone to an ozone utilization device, characterized in that said control system comprises computer means responsive to the quantity of ozone demanded by the ozone utilization device for determining the quantity of ozone to be generated by respective ozonizer modules, and means responsive to the quantity of ozone thus determined for controlling the operating condition of the ozonizer modules, and means for supplying the ozone generated by the ozonizer modules to the ozone utilization device.

BRIEF DESCRIPTION OF THE DRAWINGS

In the accompanying drawings:

FIG. 1 is a block diagram showing one embodiment of this invention of the ozonizer control system embodying the invention;

FIGS. 2 to 5 are graphs useful to explain the operation of the control system shown in FIG. 1;

FIG. 6B shows one portion of the flow chart in detail;

FIG. 7 is a graph showing the relationship between the capacity of a unit ozonizer and the cost of construction per unit capacity;

FIGS. 8A and 8B, when combined, show the detail of the control system of this invention

DESCRIPTION OF THE PREFERRED EMBODIMENT

Figure 6:
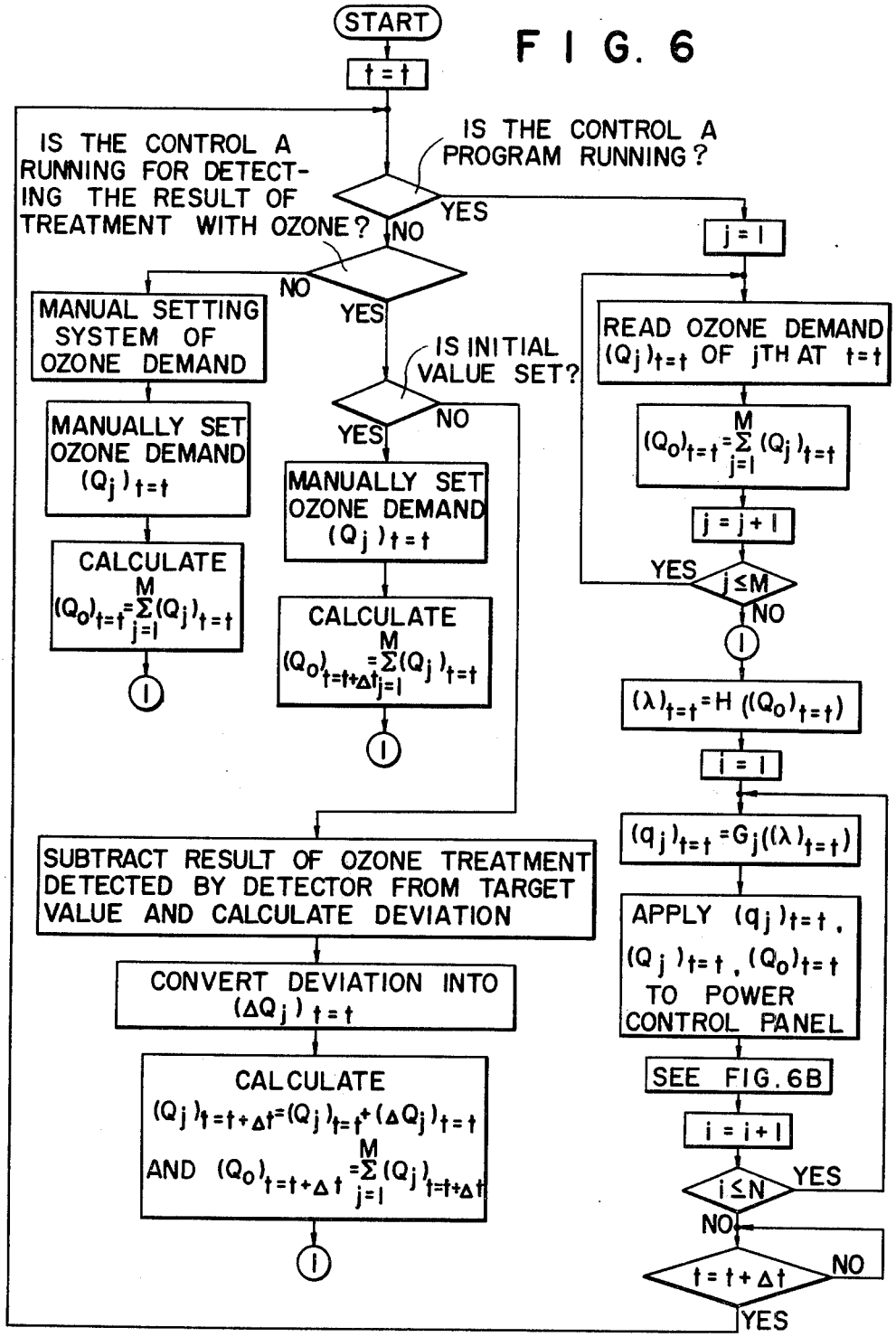
FIG. 6 is a flow chart useful to explain the control operation of the control system.

With reference to FIG. 1 of the accompanying drawings, an ozonizer system 1 is controlled by a control system 2 and the ozone generated by the system 1 is supplied to a plurality of ozone utization devices 3. The ozonizer system comprises a plurality of ozonizer modules 10 each including one or more unit ozone generating tubes in which raw material gas (air or oxygen) is treated with silent electric discharge for generating ozone, a motor operated ozone distributor 11 for distributing a quantity of ozone demanded by each utilization device 3, an AC source 12, a frequency converter 13 connected to the source 12 for converting a source frequency into a high frequency suitable for operating the ozonizer modules, 500 Hz, for example, a transformer 14 equipped with an automatic voltage adjuster for supplying a voltage corresponding to the quantity of ozone to be generated by each ozonizer module 10, a gas distributor 15 for distributing the raw material gas to respective modules 10 and for cooling and drying the raw material gas, a cooling device 16 for circulating cooling fluid through various apparatus of the ozonizer system, and an electric power distribution panel 17 for distributing an electric power control signal of the amount corresponding the ozone demand of each utilization device 3 to the gas distributor 15, the cooling device 16, ozone distributor 11 and transformer 14.

The control system 2 comprises a high efficiency running condition setter 20 capable of manually switching the control between high efficiency running and constant load running, capable of setting the quantity of ozone by a predetermined program or manual operation, capable of manually and digitally setting the demanded quantity of ozone, and capable of determining whether the modules are operable or not, a memory device 21 for storing a high efficiency operation program, informations regarding the quantity of ozone demanded by respective utilization devices 3 which varies with time, the ozone yield $Y_{i,q} = f_i(q)$ of respective ozonizer modules to be described later, etc., a high efficiency running operation unit 22 capable of operating the total ozone demand of the ozone utilization devices 3 by reading out the high efficiency operation program and the ozone demand from the memory device 21 at the time of the program running; capable of calculating the quantity of the ozone to be generated by respective ozonizer modules which is determined by the ozone demand by reading out the high efficiency operation program and the ozone yields of respective ozonizer modules from the memory device 21 thereby distributing an optimum quantity of ozone to respective ozonizer modules; capable of calculating the running conditions of respective ozonizer modules based on the distributed quantity of the ozone among respective ozonizer modules 10; capable of calculating the operating conditions of the gas distributor 15 and the cooling device 16; and capable of calculating the condition of operation of the ozone distributor 11 for distributing the generated ozone to respective utilization devices 3 based on the total ozone demand; a power control panel 23 connected to the high efficiency running operation unit 22 to receive therefrom control signals regarding the running conditions of respective ozonizer modules and the peripheral apparatus and regarding the distribution condition of the ozone distributor 11; a central operation processing unit 24 for all-inclusively controlling various elements of the control system 2 and the inputs and outputs of these elements; and a clock pulse generator 25 for supplying a clock pulse to the central operation processing unit 24.

The embodiment described above operates as follows. As shown in FIG. 2, the quantity of the ozone generated by each ozonizer module 10 varies in proportion to the voltage or frequency applied thereto so that it is possible to generate any desired quantity of ozone between the lower limit $q_L$ of the quantity of the generated ozone determined by the discharge initiation voltage and the upper limit $q_u$ determined by the breakdown voltage of the dielectrics a temperature rise, as shown in FIG. 3. Under a constant cooling condition, when the quantity of the generated ozone is increased by increasing the voltage or frequency, decomposition by heat of the generated ozone increases greatly with temperature rise so that the yield of the ozone does not increase but instead decreases even when the voltage or frequency is increased beyond a certain limit. Machines for operating the cooling device are also of the energy consumption type so that their electric efficiency reaches a maximum at a certain output and decreases thereafter. For these reasons, the relationship between the quantity of ozone generated per unit time by one ozonizer module 10 and the total power consumption of the ozonizer system, or the quantity of the ozone generated per unit discharge power, that is the yield of ozone is shown by the graph shown in FIG. 3. The curve shown in FIG. 3 reaches a maximum yield $Y_i$ at a point representing the quantity of ozone generated per unit time. Denoting the quantity of ozone per unit time generated by the i th ozonizer module by q, the ozone yield $Y_{i,q}$ is expressed as a function $Y_{i,q} = f_i(q)$.

In the subsequent discussion, the quantity of ozone demanded by the utilization device 3 will be denoted by $Q_o$ and the number of the ozonizer modules 10 denoted by N. The modules may have the same or different capacity or a yield. The following discussion relates to the latter general case. Denoting now that the quantity of ozone to be generated by the i th (i = 1, 2 ... N) module by qi and expressing the relationship between the discharge power of the i th module (or the total power consumption including the power consumed by the peripheral apparatus), generated per unit time, that is the yield by $Y_{i,qi} = f_i(q_i)$ the energy consumed by the i th module is expressed by an equation $$E_{i,qi} = q_i/f_i(q_i)$$

Thus the energy consumption E of N modules is expressed by the following equation $$E = \sum_{i=1}^{N} \frac{q_i}{f_i(q_i)} \quad (i = 1, 2, \ldots N) \quad (3)$$

The relationship between the ozone demand $Q_o$ and the quantity of the generated ozone allocated to each module is shown by $$Q_o = \sum_{i=1}^{N} q_i \quad (i = 1, 2, \ldots N) \quad (4)$$

Accordingly, the load division for each module necessary to generate ozone of the quantity equal to the demanded quantity $Q_o$ under a condition of the minimum power consumption can be determined by operating equations 3 and 4 so as to obtain qi that minimizes E.

This is a problem of partial differentiation for determining the limit of E under a binding condition $$Q_o = \sum_{i=1}^{N} q_i \quad (i = 1, 2, \ldots N)$$

and can readily be solved by the method of undetermined multipliers of Lagrange or the principle of optimum condition of dynamic programming. In the following, the steps of calculation by the method of undetermined multipliers of Langrange are discussed as an example.

By partially differentiating the both sides of the following equation 5 with qi to obtain the limit value and by putting the answer to zero equation 6 can be obtained.

$$S(q_1, q_2, \ldots q_N) = \sum_{i=1}^{N} \frac{q_i}{f_i(q_i)} - \lambda \sum_{i=1}^{N} q_i \quad (5)$$

$$\frac{\delta s}{\delta q_i} = \frac{\delta}{\delta q_i} \{ \sum_{i=1}^{N} \frac{q_i}{f_i(q_i)} \} - \frac{\delta}{\delta q_i} (\lambda \sum_{i=1}^{N} q_i) \quad (6)$$

$$= \frac{\delta}{\delta q_i} \{ \frac{q_i}{f_i(q_i)} \} - \lambda = 0$$

where $\lambda$ represents a Lagrange's multiplier. Since fi(qi) is a known function, from equation 6, qi = Gi ($\lambda$). Accordingly, the value of $\lambda$ can be determined by an equation $$Q_o = \sum_{i=1}^{N} q_i = \sum_{i=1}^{N} G_i(\lambda) \quad (7)$$

Thus, $\lambda$ = H ($Q_o$). By substituting this value of $\lambda$ into an equation qi = Gi ($\lambda$) the following equation is obtained $$q_i = G_i \{H(Q_o)\} \quad (i = 1, 2, \ldots N) \quad (8)$$

Where Gi and H mean symbols representing functions. The qi thus determined represents the optimum quantity of the generated ozone allocated to the i th module under the condition of the minimum energy consumption.

The quantity of the ozone demanded by the ozone utilization devices 3 is calculated by the following steps of calculation.

Assume now that the running load curve during one day of a utilization device, for example the boiler of a steam electric power plant has been predetermined. The quantity of flue gas containing nitrogen oxides NOx which are required to be removed by treating with ozone or the quantity of the nitrogen oxides contained in the flue gas is substantially proportional to the generator load so that the quantity of the demanded ozone can be shown by a graph shown in FIG. 4 which varies with time. Denoting the number of the ozone utilization devices 3 by M and representing the quantity of the ozone demanded by the j th utilization device at a time t by $(Q_j)_{t=t}$ as shown in FIG. 4, the quantity of the ozone $(Q_o)_{t=t}$ demanded by M utilization devices at time t is expressed by an equation $$(Q_o)_{t=t} = \sum_{j=1}^{M} (Q_j)_{t=t}$$

The M ozone utilization devices may have the same capacity and may be of the same type or have different capacity or of different type as in the cases of denitrification of flue gas or treatment of organic waste water. Where the ozone demand $(Q_j)_{t=t}$ shown in FIG. 4 is given as a function of time the ozone demand of the j th utilization device at time t can be calculated by substituting t in the function or determined by a polygonal line approximation method by sectionalizing a curve by an interval of $\Delta t$ as shown in FIG. 5. Where the load does not vary, that is where the ozone demand is constant it is possible to manually set the ozone demand and to calculate the high efficiency running condition. An alternative system of high efficiency running control is also possible wherein the result of the treatment of the ozone utilization device under any running condition which is set at time t is detected and by utilizing the detected result the quantity of the ozone generated and supplied at the next time (t + $\Delta t$) is increased or decreased by $$\sum_{j=1}^{M} \Delta Q_j$$

More particularly, according to this system, the quantity of the ozone to be supplied to each utilization device 3 at the time t of starting the running is determined to be $(Q_j)_{t=t}$, the control program is manually set in the same manner as the manual setting of the ozone demand under above described high efficiency running condition and the optimum value of the quantity of the ozone to be formed by each ozonizer module is calculated by the algorithm for the high efficiency running control described above so as to control according to the result of calculation. At the same time, the total ozone demand $$\sum_{j=1}^{M} (Q_j)_{t=t} = (Q_o)_{t=t}$$

is distributed in accordance with the set values of respective utilization devices and the result of treatment is detected by detectors provided for the utilization devices. The detected result is applied to the ozonizer control system 2 on a time sharing basis by using a multiplexing system. The control system compares, analogously or digitally, the control quantity input with a preset target value of the control quantity so as to control the absolute value and the sign of the difference or deviation. Since there is a known functional relationship between the deviation and the quantity of ozone necessary to approach the target value the quantity of ozone $(\Delta Q_j)_{t=t}$ to be increased or decreased can be determined by the absolute value of the calculated deviation and the direction of increase or decrease is determined by the sense of the deviation. From this, the quantity of the ozone to be generated and supplied at the next time $(t + \Delta t)$ at which the operation is changed can be expressed as follows $$(Q_o)_{t=t+\Delta t} = (Q_o)_{t=t} + \sum_{j=1}^{M} (\Delta Q_j)_{t=t}$$

This equation is calculated according to the algorithm of the high efficiency running control for calculating the running conditions of each ozonizer module and each peripheral apparatus at $t = t + \Delta t$ as well the distributing condition of the ozone distributor.

FIG. 6 is a flow chart showing the control operation of the control system 2 for the ozonizer system 1.

The operations shown by the flow chart are stored in the memory device 21 as a program. The high frequency running condition setter 20 designates either one of an ozone demand manual setting system, a running system for detecting the result of ozone treatment and a program running system for controlling the operation. In response to such designation the central operation processing unit 24 and the high efficiency running operation unit 22 operate to calculate, from time to time, the quantity of the generated ozone qi allocated to respective modules, the quantity of ozone $Q_j$ demanded by respective utilization devices 3 and the total quantity of ozone $Q_o$ to be generated by the entire system, for producing control signals which are applied to the power control panel 23 and converted thereby into signals for setting the power conditions of various machines and apparatus of the ozonizer system. These control signals are applied to the electric power distribution panel 17. Consequently, the electric power distribution panel 17 distributes the control signal to the transformer 14, the gas distributor 15, and the cooling device 16, whereby the distributor 11 distributes ozone among various utilization devices 3 in accordance with the demand of respective utilization devices.

The above description relates to the outline of the control system of this invention. The detail of respective component elements will now be described with reference to FIGS. 8A, 8B and 9.

Figure 8B:
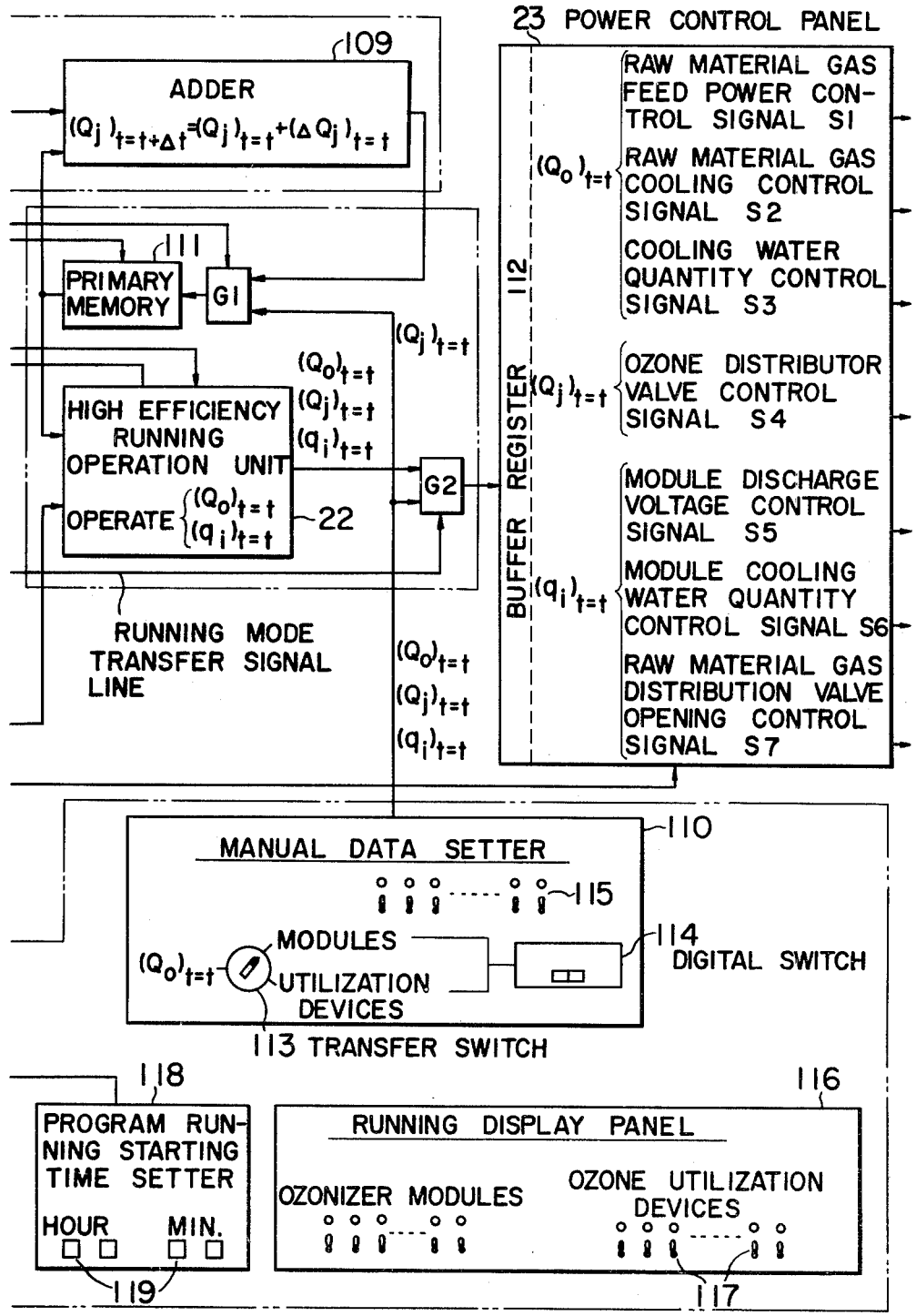

As shown in FIGS. 8A and 8B the results of ozone treatment performed by respective ozone utilization devices 3 (j = 1, j = 2, j = 3) are sensed by sensors 101 and the outputs of these sensors are amplified by amplifiers 102, filtered by filters 103 and then applied to a multiplexer 104, which under the control of a channel address signal from the central operation processing unit 24 produces a data signal on the time sharing basis which is applied to an analogue-digital converter 106 via a sample/hold circuit 105 which is controlled by a sample/hold command signal supplied from the central operation processing unit 24 for producing a signal $\beta$.

This signal is applied to a subtrator 107 which calculates the deviation $\Delta = K - \beta$, where K represents the reference or target value of ozone treatment. The output from the subtrator 107 is applied to an ozone quantity converter 108 where a conversion $(\Delta Q_j)_{t=t} = C \times \Delta$ is made. The output from the ozone quantity converter 108 is applied to an adder 109 where a calculation $(Q_j)_{t=t+\Delta t} = (Q_j)_{t=t} + (\Delta Q_j)_{t=t}$ is made. A high frequency running control mode transfer gate circuit $G_1$ is provided which is controlled by a control mode transfer signal sent from the central operation processing unit 24 for storing the output from the adder 109 or signal $(Q_j)_{t=t}$ from a manual data setter 110 in a primary memory device 111, the output thereof being supplied to the adder 109 and the high efficiency running operation unit 22. This unit 22 operates the data read out from the memory device 21 and the primary data and supplies the operated data signal to a running mode transfer gate circuit $G_2$ which under the control of a running mode transfer signal sent from the central operation processing unit 24 applies either the output from the high efficiency running operation unit 22 or signals $(Q_o)_{t=t}$, $(Q_j)_{t=t}$ and $(q_j)_{t=t}$ to the power control panel 23. The power control panel 23 comprises a buffer register 112 and produces, under the control of the central operation processing unit 24, a raw material gas feed power control signal S1, a raw material gas cooling control signal S2, a cooling water quantity control signal S3 from $(Q_o)_{t=t}$; an ozone distributor value control signal S4 from $(Q_j)_{t=t}$; a module discharge voltage control signal S5, a module cooling water quantity control signal S6 and a raw material gas distribution valve opening control signal S7 from $(q_j)_{t=t}$. The purpose of these control signals will be described later with reference to FIG. 9.

As diagrammatically shown in FIGS. 8A, and 8B high efficiency running condition setter 20 comprises the manual data setter 110 which includes toggle switches 115 for setting signals $(Q_o)_{t=t}$, $(Q_j)_{t=t}$ and $(q_j)_{t=t}$, a transfer switch 113 for selecting ozonizer modules, ozone utilization devices, the total ozone quantity $(Q_o)_{t=t}$, a digital switch 114 for setting the device number of the ozonizer module or ozone utililization devices, and toggle switches 115 for setting the gas quantity. There are also provided a running display pannel 116 including a number of toggle switches 117 for ozonizer modules and ozone utilization devices; a program running starting time setter 118 connected to the central operation processing unit 24 and including a number of toggle switches 119 for setting hours and minutes; a clock pulse generator 25 connected to the central operation processing unit 24; a high efficiency running control mode setter 120 for setting a program operation, a manual operation or a detection operation and connected to the control mode input of the central operation processing unit 24, a running mode setter 121 for setting a high efficiency running mode or a constant load running mode and connected to the running mode input of the central operation processing unit 24; a running control panel 122 including start and stop buttons; and a control source pannel 123.

Figure 9:
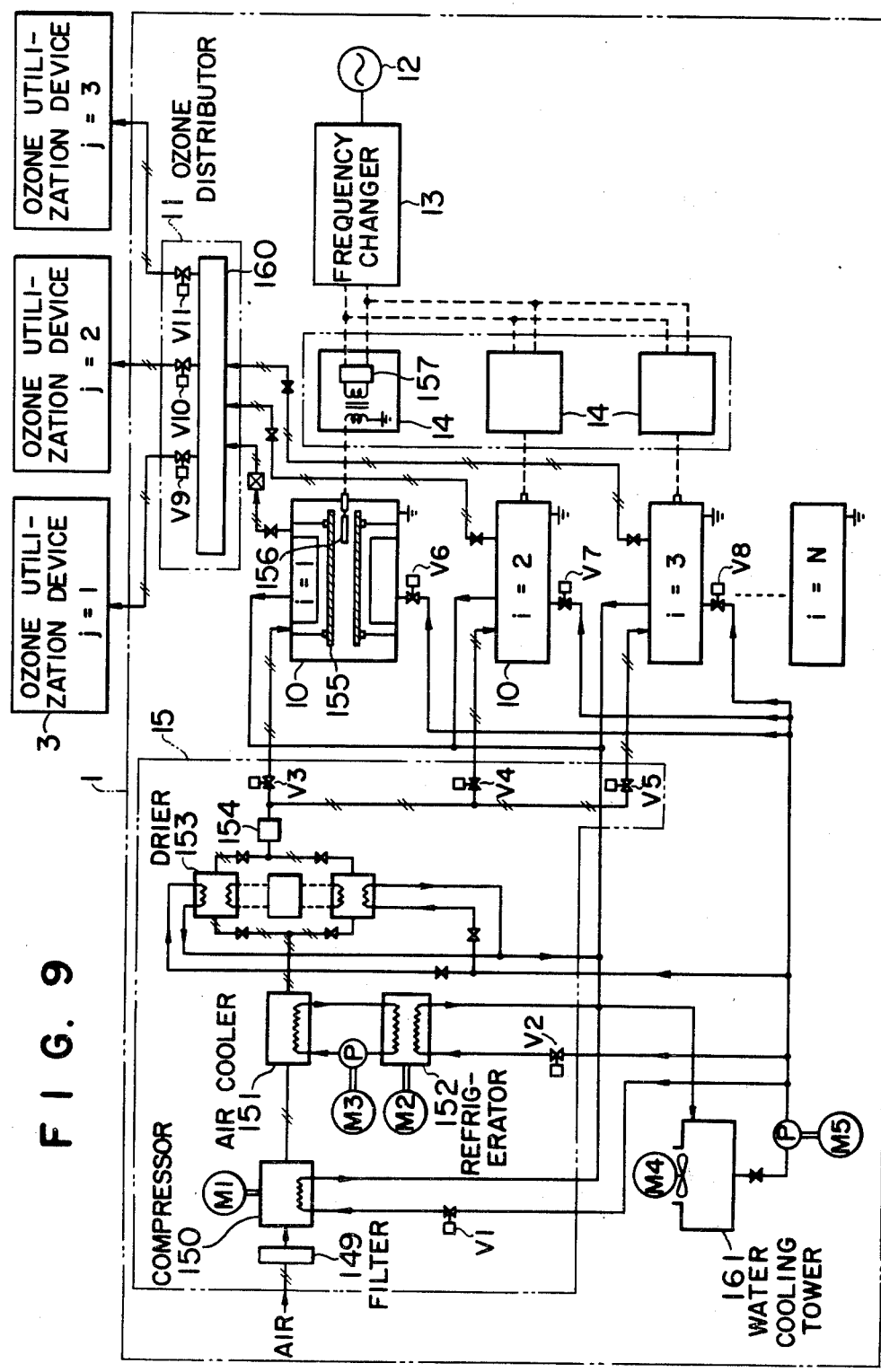
FIG. 9 is a diagram showing the flow of raw material gas, generated ozone and cooling water.

Turning now to FIG. 9, the raw material gas, air in this case, is supplied to a compressor 150 through a filter 149. Then the compressed air is cooled by an air cooler 151 which is supplied with refrigerant, brine for example, from a refrigerator 152, and the air thus cooled is supplied to parallelly connected ozonizer modules 10 (i = 1, i = 2 ... i = N) through driers 153, for example absorption type driers, a pressure regulating valve 154 and distribution valves $v_3$, $v_4$ and $v_5$. Each module 10 comprises a glass tube 155 and a discharge electrode 156 which is connected to the secondary winding of the variable voltage transformer 14. In this example, the secondary voltage of the transformer 14 is adjusted by a voltage adjuster 157, such as an induction regulator or a tap-changer on the primary side. The ozone generated by respective ozonizer modules 10 is collected in a tank 160 in the ozone distributor 11 and then supplied to ozone utilization devices 3 (j = 1, j = 2, j = 3) respectively through valves $v_9$, $v_{10}$ and $v_{11}$. Cooling water is circulated from a water cooling tower 161 to compressor 150, refrigerator 152, driers 153, and ozonizer modules 10 respectively through valves $v_1$, $v_2$, $v_6$, $v_7$ and $v_8$.

Control signals S1 through S7 generated by the power control panel 23 are used as shown in the following Table.

Table

| control signal | controlled objects |
|---|---|
| S1 | compressor driving motor M1 cooling water valve $v_1$ for compressor 150 |
| S2 | refrigerator compressor driving motor M2 brine pump driving motor M3 cooling water valve $v_2$ for refrigerator 152 |
| S3 | cooling fan driving motor M4 of water cooling tower 161 |
| S4 | cooling water circulating pump driving motor M5 |
| S5 | distribution valves $v_9$, $v_{10}$, $v_{11}$ for ozone utilization devices 3 |
| S6 | primary voltage adjusters 117 of variable voltage transformers 14 for ozonizer modules 10 |
| S7 | ozonizer module cooling water valves $v_6$, $v_7$, $v_8$ air distribution valves $v_3$, $v_4$, $v_5$ for ozonizer modules 10. |

The operations shown in this Table are performed by the power control panel 23 shown in FIG. 1.

As above described, this invention provides a novel control system for an ozonizing system capable of operating with a minimum energy wherein when the load of an ozone utilization device, for example the generator load of a steam electric generating plant, hence the quantity of the flue gas or the concentration of nitrogen oxides contained in the flue gas of a boiler which varies in proportion to the generator load or the quantity of exhaust water containing organic substances or the BOD concentration of the waste water, varies with time, such control quantity which varies with time is used as the data for performing a programmed operation of the ozonizing system thereby providing an energy save type ozonizer system. Accordingly, it is possible to decrease the running cost of the ozonizer system and hence the cost of the ozone generated. Furthermore, as the control system is constructed to use the result of detecting the result of ozone treatment it is possible not only to save energy but also to automatically limit the quantity of the harmful substances contained in flue gas or waste water to a safe value below a limit. Since ozone is a secondary pollution substance, that is an oxidant that causes pollution of atmosphere, that is so-called photochemical smog, it is necessary to add apparatus for treating exhaust ozone to an ozone utilization device, for example a flue gas denitrification device for decomposing ozone discharged therefrom without performing the desired reaction. Where an ozonizer system which always generates a constant quantity of ozone is applied to a system whose load varies with time, it is necessary to use exhaust ozone treating apparatus having a capacity commensurating with the maximum quantity of the exhaust ozone. According to this invention, however, since the ozonizer system is controlled to generate a quantity of ozone commensurating with the ozone demand of the ozone utilization device the quantity of ozone exhausted from the utilization device is small and constant, it is possible to reduce the capacity of the ozone utilization device and increase its operating efficiency.

The relationship between the capacity of unit ozonizer and the construction cost per unit capacity is shown by a graph of FIG. 7. Accordingly, it is possible to construct an ozonizer system having any desired capacity by combining unit ozonizers having different capacities $q_a$, $q_b$ ... $q_e$ as shown in FIG. 7. Furthermore, since the ozonizer system is made up of ozonizer modules it is possible to improve the utilization factor of the ozonizer system over the conventional system using a single ozonizer having the same capacity while maintaining a high efficiency running under partial load.

Thus, according to this invention it is possible to run the ozonizer system always at a high efficiency.

I claim:

1. A control system of an ozonizer system comprising a plurality of ozone utilization devices; a plurality of ozonizer modules; an ozone distributor connected between the ozone utilization devices and the ozonizer modules for distributing ozone generated by said ozonizer modules among said ozone utilization devices; a raw material gas distributor for supplying raw material gas to said plurality of ozonizer modules; a source of variable voltage for supplying variable operating voltage to respective onozizer modules; a plurality of sensors which sense the operating conditions of respective ozone utilization devices; means responsive to the outputs of said sensors for producing a signal representing the quantity of ozone demanded by said ozone utilization devices; a central operation processing unit of an electronic computer, said central operation processing unit including a first memory device; a primary memory device controlled by said central operation processing unit and connected to receive the output signal of said means producing a signal representing ozone demand; an operation unit controlled by said central operation processing unit for operating on the data stored in said first memory device and said primary memory device; a power control panel connected to receive the output of said operation unit and controlled by said central operation processing unit for generating control signals for controlling the distribution of ozone among said ozone utilization devices, the voltage generated by said source of variable voltage, and the distribution of the raw material gas among said ozonizer modules; and a running condition setter including means for manually selecting the ozone modules and determining a total ozone quantity demanded by said ozone utilization devices which is applied to said primary memory device, and a clock pulse generator for supplying a clock pulse to said central operation processing unit.

2. The control system according to claim 1 which further comprises a cooling device for circulating a cooling medium through said ozonizer modules, and wherein said power control panel further generates a control signal which controls the circulation and temperature of said cooling medium.

3. The control system according to claim 1 wherein said running condition setter further comprises a running control model setter which sets a program operation in said central operation processing unit.

4. The control system according to claim 1 wherein said running condition setter further comprises a running mode setter for setting a high efficiency running mode or a constant load running mode in said central operation processing unit.

5. The control system according to claim 1 which further comprises means for cooling and drying the raw material gas supplied to respective ozonizer modules in response to the quantity of ozone demanded by said ozone utilization devices.

6. The control system according to claim 1 wherein each one of said ozonizer modules comprises a plurality of unit ozone generators having different capacities.

* * * * *